Figures 1, 2:
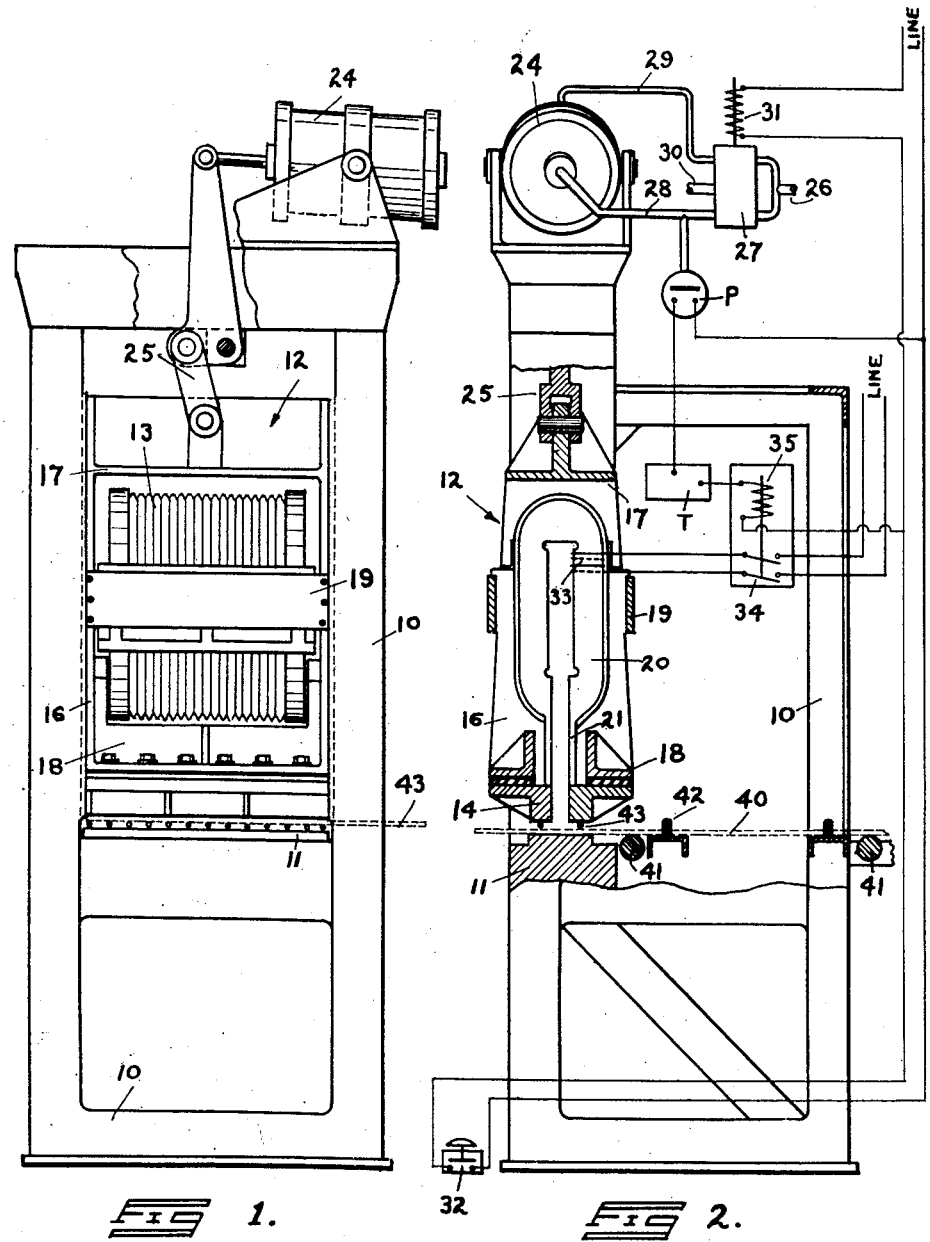

Jan. 6, 1942.  S. HUMPHREY  2,269,091

WELDING MACHINE

Filed Sept. 14, 1939

Inventor
STANLEY M. HUMPHREY
By Francis J. Klempay
Attorney

Patented Jan. 6, 1942

2,269,091

UNITED STATES PATENT OFFICE 2,269,091

WELDING MACHINE

Stanley Humphrey, Warren, Ohio, assignor to The Taylor-Winfield Corporation, Warren, Ohio, a corporation of Ohio Application September 14, 1939, Serial No. 294,924

1 Claim. (Cl. 219—4)

This invention relates to an apparatus for effecting welds electrically and more particularly to improved features of design of such apparatus as effect the means for conducting the welding current to the work and for applying the welding pressure thereto. The principal objects of the invention are the simplification of design and construction of such apparatus, the reduction in electrical losses during operation of the machine with a consequent increase in efficiency, and the elimination of certain parts requiring frequent maintenance whereby the general overall maintenance of the machine may be reduced to a minimum.

These and other objects and advantages of the invention will become apparent as the description of the invention proceeds. For illustration purposes, the invention will be described as embodied in a machine for making welded wire grating, although it should be apparent that the principles of the invention are applicable in a wide variety of installations for innumerable purposes.

In the drawing:

Figure 1 is a front view of a machine constructed according to the principles of my invention which machine is particularly useful in welding together the longitudinal and transverse wires or rods to form grating; and Figure 2 is a side view, partly in section, of the machine of Figure 1, and incorporating a schematic energizing and control diagram.

The machine illustrated consists essentially of a main frame 10 carrying a horizontal conductive anvil 11 upon which the work rests during the welding operation, and a sliding frame 12 carrying the welding transformer generally indicated at 13 and horizontally extending bar type electrodes 14 adapted to move toward and away from the anvil 11 as the frame 12 slides relative to the main frame 10. Frame 10 is fabricated from structural elements and the anvil 11 may be in the nature of a strut interconnecting side members thereof. Sliding frame 12 consists of two side rails 16 provided with suitable guide surfaces, not shown, cooperating with vertical guide surfaces, not shown, on main frame 10, an upper strut 17, and a pair of spaced lower struts 18. Transformer 13 is conveniently supported on the plates 19 spanning the side rails 17 intermediate their upper and lower ends.

Mechanically secured to each of the struts 18 but insulated therefrom is a bar type electrode 14 which extends horizontally over the anvil 11. As shown in Figure 2, the electrodes 14 extend inwardly beyond the inner faces of the struts 18 thus enabling short direct connections 21 to be made between the electrodes and the secondary turns 20 of the transformer 13. In practice the connections 21 may be simply rigid integral projections from the secondary sections 20 and thus there is eliminated any need for multiple electrical connections and flexible current transmission devices. The elimination of the connections and current transmission devices results in lower secondary impedance and lower kv.-a. demand. This feature is of particular importance in machines of the general type chosen inasmuch as a multiplicity of welds—perhaps fifty or more—are made simultaneously and in the past machines designed for this type of work have had a very high kv.-a. demand. In the machine illustrated, the electrodes 14 are shown as being members separate from the transformer secondary, but it should be obvious that the function of the electrode may be performed by members which are cast integral with the turns 20 and forming, in effect, the conventional secondary terminals.

Any suitable means, as the air cylinder 24 operating through the bell crank 25, may be employed to move the frame 12 vertically and to apply the required welding pressure. Air under pressure from a suitable source 26 and controlled by a two position valve is used to operate the air cylinder. A conduit 28 connects one of the valve ports with the space in cylinder 24 behind the piston (not shown) and a second conduit 29 connects another port of the valve 27 with the space in the cylinder on the opposite side of the piston. In one position of the valve air under pressure is admitted through conduit 28, the conduit 29 being then connected with an exhaust 30, and in the other position of the valve air under pressure is admitted to conduit 29 and conduit 28 is connected with the exhaust. Valve 27 is operated by suitable motor 31 energized by current from the line shown and controlled by a switch 32 which may be either manually or automatically controlled.

Primary 33 of the transformer 13 is energized from a line as shown and such energization is controlled by a switch 34 actuated by solenoid 35 which solenoid is in a series circuit including a power source, a timer T and a pressure responsive switch P, the latter being actuated by pressure in conduit 28 which pressure acts to move the transformer and electrodes 14 towards the anvil 11 and applies the welding pressure. In accordance with usual practice, the operation of the controls described is such that when sufficient pressure is built up in conduit 28 resulting from actuation of switch 32 and indicating that sufficient welding pressure has been applied, switch P is closed resulting in a timed energization of the welding transformer.

In the machine specifically disclosed the wires or rods 40 forming the longitudinal elements of the grating being fabricated are moved into the machine from back to front, suitable supports 41 and spacing means 42 being provided to support and align the wires or rods. The transverse rods 43 are moved into the machine from the side thereof and, as shown in Figure 2, one of such rods underlies each of the electrodes 14. As the welding operation is effected series welds are made between each of the rods 43 and the longitudinal rods 40, the conductive anvil 11 forming the return circuit for the welding current.

It should now be apparent that the invention provides an improved arrangement for supporting the welding transformer and applying welding pressure to the work and that such improved arrangement results in the simplification of design and greater economy in operation due to the reduction in impedance and less maintenance cost. The simplification arises from the elimination of conductors as explained above and from the fact that since the weight of the transformer is utilized in applying the welding pressure, lighter and more simple means may be employed to apply such pressure. The above specifically described embodiment of the invention should be taken as illustrative only as obviously many changes may be made therein without departing from the spirit or scope of the invention.

What I claim is:

In apparatus of the character described the combination of a fixed frame, an elongated anvil of electrically conductive material fixed on said frame, a carrier slidably mounted on said frame above said anvil for movement toward and away from said anvil, a welding transformer carried by said carrier, a pair of spaced welding electrodes directly connected in close coupled relation with the secondary turns of said transformer, each of said electrodes overlying said anvil substantially throughout the extent thereof, power means to slidably move said carrier and consequently said electrodes toward and away from said anvil, said means being operative to apply welding pressure to work positioned between said electrodes and said anvil, and means to apply current to the primary turns of said transformer upon actuation of said means to apply welding pressure.

STANLEY HUMPHREY.